(12) United States Patent
Balakrishnan et al.

(10) Patent No.: US 8,736,433 B2
(45) Date of Patent: May 27, 2014

(54) APPARATUS AND METHOD TO DETECT VEHICLE THEFT

(75) Inventors: Arun Balakrishnan, San Diego, CA (US); Alexander Gantman, San Diego, CA (US); Brian M. Rosenberg, San Diego, CA (US); Yinian Mao, San Diego, CA (US); Renwei Ge, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 12/888,206

(22) Filed: Sep. 22, 2010

(65) Prior Publication Data

US 2012/0068837 A1    Mar. 22, 2012

(51) Int. Cl.
*G08G 1/096883*    (2006.01)

(52) U.S. Cl.
USPC ............... 340/426.1; 340/988; 340/932.2

(58) Field of Classification Search
CPC ......... G08G 1/14; G08G 1/205; G08G 1/146; G08G 1/096883; G06Q 30/0284; G07B 15/02; G07B 15/063
USPC ...................................................... 340/426.1
See application file for complete search history.

(56) References Cited

U.S. PATENT DOCUMENTS

| | | | | |
|---|---|---|---|---|
| 5,504,314 A * | 4/1996 | Farmont | ....................... | 235/384 |
| 7,154,384 B2 * | 12/2006 | Nitou | ...................... | 340/426.16 |
| 8,081,060 B1 * | 12/2011 | Saarisalo et al. | ............. | 340/10.1 |
| 2005/0099320 A1 * | 5/2005 | Nath et al. | ..................... | 340/933 |
| 2005/0116816 A1 * | 6/2005 | Nitou | ......................... | 340/426.1 |
| 2005/0125669 A1 | 6/2005 | Stewart et al. | | |
| 2005/0151619 A1 | 7/2005 | Forest et al. | | |
| 2006/0152349 A1 | 7/2006 | Ratnakar | | |
| 2008/0071611 A1 * | 3/2008 | Lovett | ............................ | 705/13 |
| 2013/0094902 A1 * | 4/2013 | Chang | .............................. | 404/6 |
| 2013/0143536 A1 * | 6/2013 | Ratti | .......................... | 455/414.1 |

FOREIGN PATENT DOCUMENTS

EP    0839699 A1    5/1998
WO    9527640 A1    10/1995

OTHER PUBLICATIONS

International Search Report and Written Opinion—PCT/US2011/052779—ISA/EPO—Jan. 16, 2012.
Sellappan Palaniappan, et al., "Intelligent Indoor Parking Management System", pp. 293-302.

* cited by examiner

*Primary Examiner* — Travis Hunnings
(74) *Attorney, Agent, or Firm* — Won Tae Kim

(57) ABSTRACT

Disclosed is an apparatus and method to detect vehicle theft. In one embodiment, a processor may be configured to execute instructions to: receive a vehicle detection signal from a vehicle detector; determine whether a vehicle is present or absent based upon the vehicle detection signal; establish an authentication credential after the vehicle is determined to present; and validate the authentication credential to indicate validated parking. If the vehicle is determined to be absent and an authentication credential to un-park the vehicle has not been validated, a notification action may be transmitted to appropriate personnel to indicate that the vehicle has been moved or un-parked without proper authentication.

38 Claims, 4 Drawing Sheets

APPARATUS AND METHOD TO DETECT VEHICLE THEFT

BACKGROUND

1. Field

The present invention relates generally to an apparatus and method to detect vehicle theft.

2. Relevant Background

At parking areas for the general public such as malls, parks, theaters, etc., and parking areas for particular individuals such as, corporate and government buildings, there are dangers associated with vehicle theft. Further, there are security problems associated with individuals parking (e.g., a vehicle user not being authorized to park or not properly paying for parking).

Although various attempts have been made in the past to verify a vehicle user's authentication to park in a parking lot or to determine if a vehicle is being stolen, previous attempts do not adequately combine both properly authenticating a vehicle user when the vehicle is parked and when the vehicle is un-parked and properly notifying appropriate personnel if a vehicle is un-parked when the vehicle user has not been adequately authenticated.

There is therefore a need for techniques to both properly authenticate a vehicle user while parking and un-parking a vehicle and properly notifying appropriate personnel if the vehicle is un-parked without proper authentication of the vehicle user.

SUMMARY

Embodiments of the invention may relate to an apparatus and method to detect vehicle theft. In one embodiment, a processor may be configured to execute instructions to: receive a vehicle detection signal from a vehicle detector; determine whether a vehicle is present or absent based upon the vehicle detection signal; establish an authentication credential after the vehicle is determined to be parked; and validate the authentication credential to indicate validated parking. If the vehicle is determined to be absent and an authentication credential to un-park the vehicle has not been validated, a notification action may be transmitted to appropriate personnel to indicate that the vehicle has been moved without proper authentication.

In one embodiment, a computer program product comprises a computer-readable medium that comprises code for: receiving a vehicle detection signal from a vehicle detector; determining whether a vehicle is present or absent based upon the vehicle detection signal; establishing an authentication credential after the vehicle is determined to be parked; and validating the authentication credential to indicate validated parking. If the vehicle is determined to be absent and an authentication credential to un-park the vehicle has not been validated, a notification action may be transmitted to appropriate personnel to indicate that the vehicle has been moved without proper authentication.

DETAILED DESCRIPTION

The word "exemplary" is used herein to mean "serving as an example, instance, or illustration." Any embodiment described herein as "exemplary" or "example" is not necessarily to be construed as preferred or advantageous over other embodiments.

Figure 1:
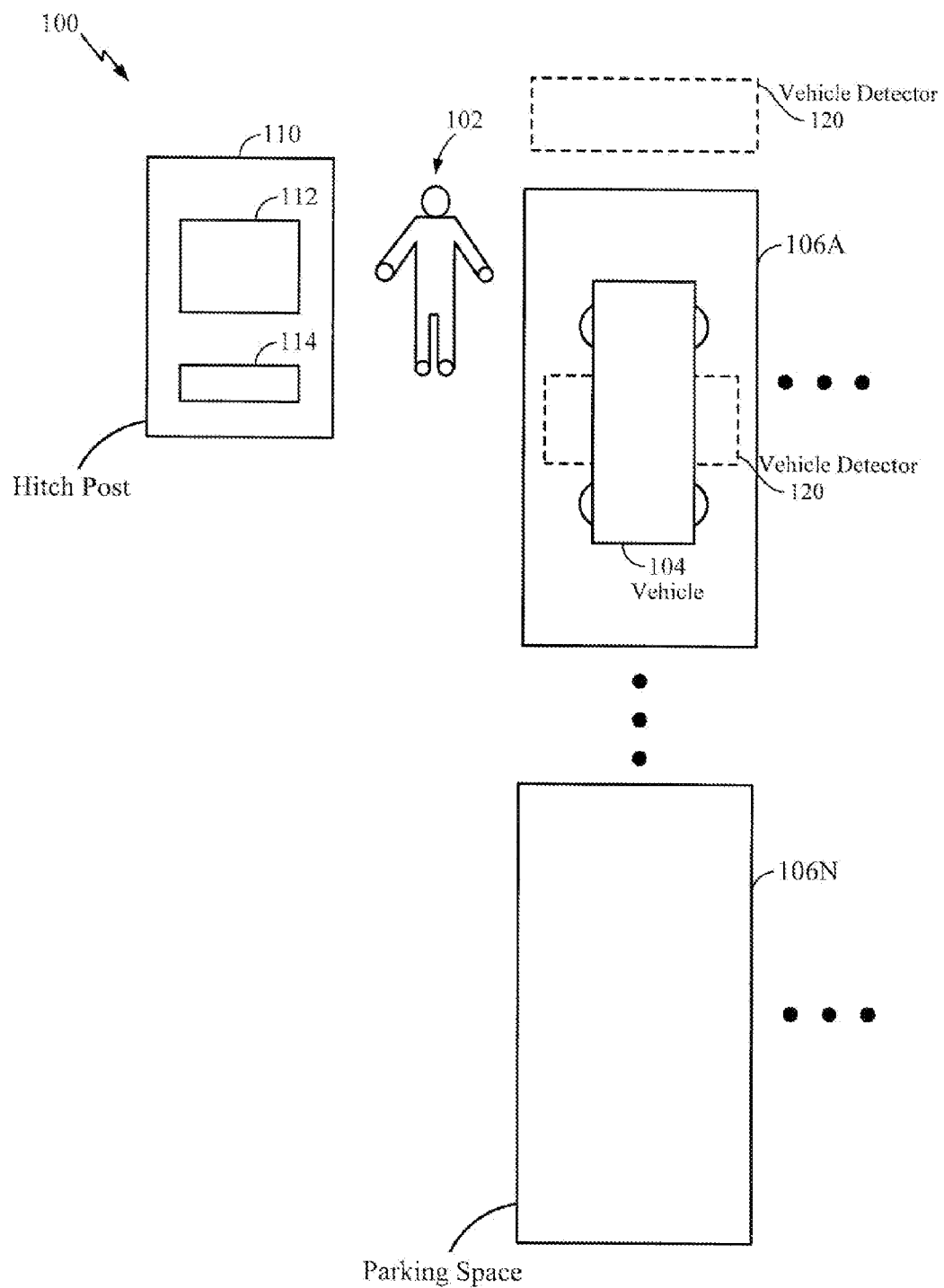
FIG. 1 is a block diagram of a system illustrating a hitch post apparatus and a parking lot.

With reference to FIG. 1, FIG. 1 is a block diagram of a system 100 in which embodiments of the invention may be practiced. In particular, system 100 illustrates an apparatus 110, such as a hitch post, that may be utilized to detect vehicle theft. As shown in FIG. 1, a vehicle user 102 may park a vehicle 104 in a parking space 106A of a parking lot. It should be appreciated that there may be a plurality of different parking spaces 106A-106N in the parking lot, and although only one hitch post 110 is shown, it should be appreciated that an appropriate number of hitch posts may be utilized.

In one embodiment, when the vehicle 104 is present, a vehicle detector 120 may detect that the vehicle is present and transmit a vehicle detection signal to the hitch post 110. Based upon the receipt of the vehicle detection signal, the hitch post 110 may determine whether the vehicle 104 is present or absent. Further, the hitch post 110 may include a display device 112 and a user input device 114, such as, a keyboard, for display and communication with the vehicle user 102.

Figure 2:
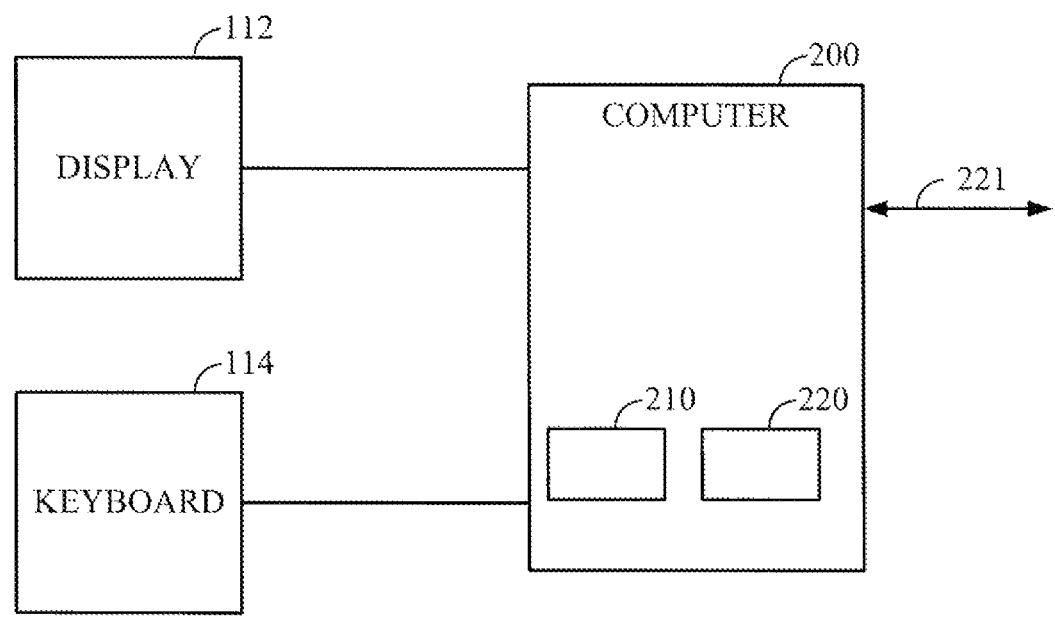
FIG. 2 is a block diagram illustrating a hitch post apparatus that may include a computer.

With reference also to FIG. 2, the hitch post apparatus 110 may include a computer 200 that includes a processor 210 and a memory 220. Computer 200 of the hitch post 110 may further be coupled to the display device 112 and keyboard 114. Further, the computer 200 of the hitch post 110 transmits and receives signals 221 (either wired and/or wireless) such as the vehicle detection signal, notification actions, and wireless communications with the vehicle user and other computers and individuals, as will be described.

Thus, in one embodiment, hitch post 110 may include a computer 200 having a processor 210 configured to execute instructions to: receive a vehicle detection signal 221 from a vehicle detector 120; determine whether a vehicle 104 is present or absent based upon the vehicle detection signal 221; and validate an authentication credential to indicate whether the parking of vehicle 104 for the vehicle user 102 is correctly validated. Further, as will be described, processor 210 may transmit a notification action if the authentication credential to un-park the vehicle 104 is not validated and the vehicle 104 is determined to be absent. Also, memory 220 may be configured to store these and other instructions to accomplish these and other functions.

It should be appreciated that embodiments of the invention as will be hereinafter described may be implemented in conjunction with the execution of instructions by processor 210 of the hitch post 110 and/or other circuitry of the hitch post 110 and/or other devices. Particularly, circuitry of the hitch post 110, including but not limited to processor 210, may operate under the control of a program, routine, or the execution of instructions to execute methods or processes in accordance with embodiments of the invention. For example, such a program may be implemented in firmware or software (e.g. stored in memory 220 or other locations) and may be implemented by processors, such as processor 210, and/or other circuitry of hitch post 110. Further, it should be appreciated that the terms processor, microprocessor, circuitry, controller, etc., refer to any type of logic or circuitry capable of executing logic, commands, instructions, software, firmware, functionality, etc.

In one embodiment, when a vehicle 104 is present, hitch post 110 receives a vehicle detection signal from the vehicle detector 120. The hitch post 110 determines whether a vehicle is present or absent based upon receipt or non-receipt of the vehicle detection signal.

Once a vehicle 104 is present, a vehicle user 102 may input an authentication credential to the hitch post 110, such as, through a user interface, such as, keyboard 114. However, as will be described, other methods or means for communicating authentication credentials with the vehicle user 102 and hitch post 110 may be utilized. For example, the authentication credential may be established by at least one of a vehicle user, the processor 210, or mutually by the processor 210 and the vehicle user 102. The hitch post 100 may then determine whether the authentication credential is valid such that the parking of the vehicle 104 is validated.

However, if the authentication credential is not validated, the hitch post 110 may transmit a notification action to indicate that the parking of vehicle 104 is not validated. This notification action may be sent to a parking attendant, police authority, or gate, as will be described.

Further, if the vehicle is determined to be absent by the vehicle detector 120 sending (or not sending) a vehicle detection signal to the hitch post 110, and the hitch post 110 determines that the vehicle 104 is absent, and that an authentication credential to un-park the vehicle has not been validated, then the hitch post may transmit a notification action to a parking attendant, the police authority, or a gate, as will be described.

Different types of vehicle detectors 120 may be utilized to generate vehicle detection signals for transmission to the hitch post 110. In one embodiment, vehicle detector 120 may be a passive vehicle detector. Examples of passive vehicle detectors that may be utilized include weight detectors, metal detectors, video cameras, or radar detectors.

In another embodiment, the vehicle detector 120 may be an active vehicle detector. For example, an active vehicle detector 120 may be a radio frequency identification (RFID) token used with the vehicle 104 or user 102. Further, an active vehicle detector 120 may be a near field mutual communication system used with the vehicle 104 or the user 102.

In these examples, reference to a passive vehicle detector indicates that the vehicle (e.g., a car) is not involved in generating the vehicle detection signal (i.e., it is passive) whereas for an active vehicle detector the vehicle itself is involved in generating the vehicle detection signal (i.e., it is involved). It should be appreciated by those of skill in the art that these are just examples of different types of vehicle detectors that may be passive, active, etc., and that a wide variety of different types of detectors for generating vehicle detection signals may be utilized. Further, it should be appreciated that although a car is shown as an example of vehicle, a wide variety of vehicles may be utilized such as trucks, vans, motorcycles, bikes, boats, planes, helicopters, or any type of moveable vehicle.

Figure 3:
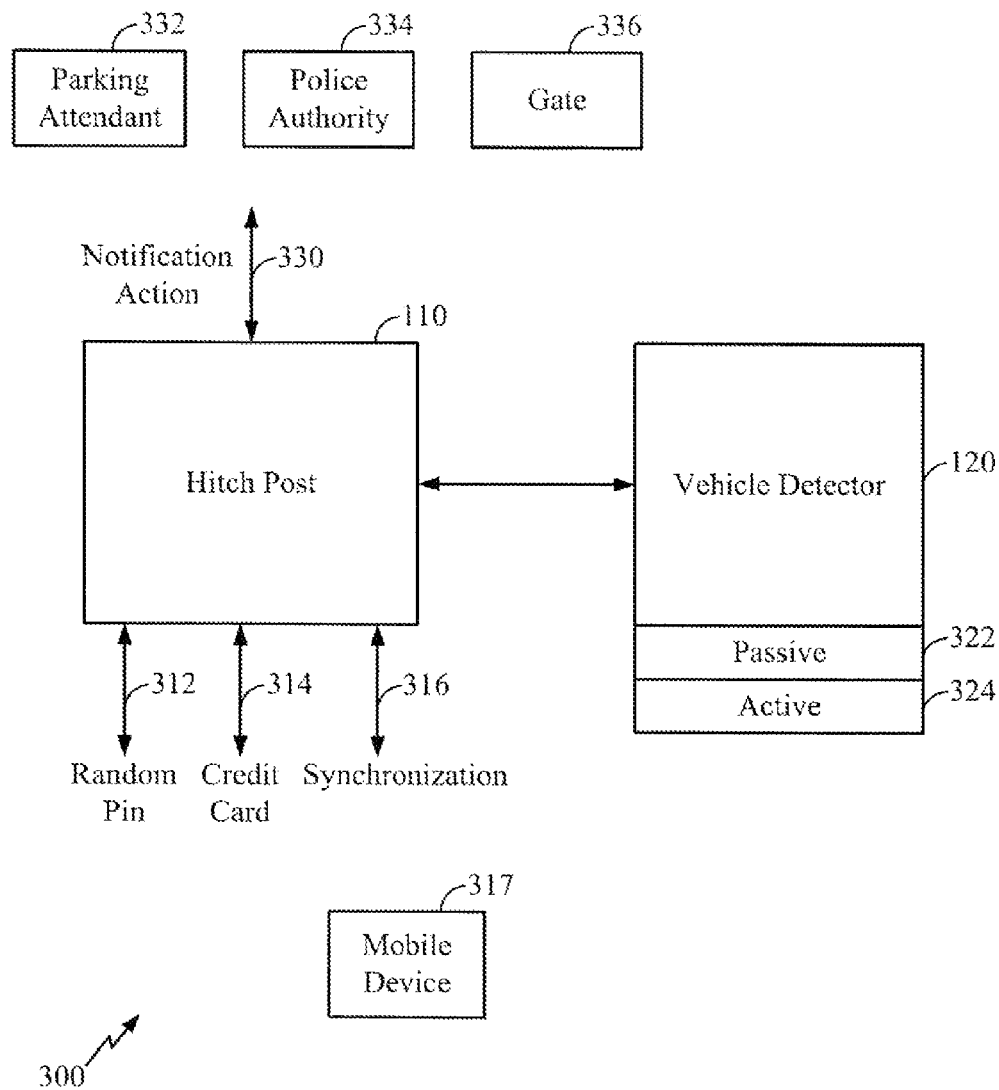
FIG. 3 is a block diagram illustrating a hitch post that receives particular types of authentication credentials.

With reference also to FIG. 3, a block diagram is shown that further illustrates a system 300 in which the hitch post 110 may receive particular types of authentication credentials. Hitch post 110 may establish an authentication credential after the vehicle 104 is determined to be present and may validate the authentication credential to indicate validated parking. Further, the hitch post 110 may transmit a notification action 330 to a parking attendant 332, police authority 334 or gate 336 if the authentication credential for a vehicle that is moved or un-parked is not validated. FIG. 3 illustrates some particular types of authentication credentials that may be utilized. Also, FIG. 3 illustrates that the vehicle detector 120 may utilize any of the previously-described types of passive vehicle detectors 322 or active vehicle detectors 324.

A wide variety of different types of authentication credentials between the vehicle user 102 and the hitch post 110 may be utilized. For example, in one embodiment, the authentication credential may be a random PIN 312 generated by the hitch post 110 and shared with the vehicle user 102. As an example, hitch post 110 may generate a random PIN 312 and display the random PIN 312 upon the display device 112. Further, the hitch post 110 may print out the random PIN for the vehicle user 102. In this embodiment, when the vehicle user 102 returns to un-park their vehicle 104, to authenticate that they are the vehicle user, the vehicle user 102 may input via the keyboard 114 or on the display device itself 112 the previously-generated random PIN. In this way, the vehicle user 102 is authenticated and can un-park the vehicle without a notification action being sent. Additionally, the vehicle user may be charged a fee by the hitch post 110.

In one embodiment, the authentication credential may be a credit card or debit card 314. In this embodiment, after the vehicle user 102 has parked their vehicle 104, the vehicle user 102 may provide the credit card 314 as an authentication credential to the hitch post 110. For example, the vehicle user 102 may insert the credit card 314 into the hitch post 110 or type in the credit card number into the keyboard 114 of the hitch post 110.

Thus, when the vehicle user 102 returns to un-park the vehicle 104, the hitch post 110 validates the credit card 314 as the authentication credential and the vehicle 104 may then be moved or un-parked validly without a notification action 330 being sent. Further, the hitch post 110 may utilize the credit card 314 for a parking fee.

In another embodiment, the authentication credential may include a synchronization signal 316 associated with a mobile device 317 (e.g., a cell phone) or another device. It should be appreciated that other types of synchronization signals may be transmitted and received using a wide variety of different technologies and may be used with a wide variety of different types of mobile devices. For example, the synchronization signal 316 may be associated with the serial ID of the mobile device 317 or a BlueTooth device ID. It should be appreciated that any type of mobile device: cell phone, smart phone, smart card, mobile computer, PDA, a particular mobile parking device, etc.; may be utilized.

In this embodiment, after the vehicle user 102 parks their vehicle 104, the hitch post 110 receives a synchronization signal 316 from the mobile device 317 and the hitch post 110 determines whether or not to validate the synchronization signal to indicate validated parking. Further, when the vehicle user 102 returns to un-park their vehicle 104, the hitch post 110 determines if the synchronization signal 316 from the mobile device 317 is authenticated and whether or not the vehicle user 102 should be allowed to un-park or move the vehicle 104. If the synchronization signal 316 is not validated and the vehicle is determined to be absent, then a notification signal 330 may be sent to a parking attendant 332, police authority 334 or gate 336. Therefore, as previously described, the authentication credential may be symmetric (e.g., involving vehicle user interaction with the hitch post) or asymmetric (e.g., not involving vehicle user interaction with the hitch post).

It should be appreciated that the vehicle user 102 may also be notified that the authentication credential is not correct either by audio words or sounds (e.g., an alarm) from the hitch post 110, by visual messages on the display device 112 of the hitch post 110, by calls, short message services (SMSs), text messages to their mobile device 317, etc.

Thus, as previously described, if a vehicle user 102 moves or un-parks a vehicle 104 such that the hitch post 110 receives a vehicle detection signal from the passive and/or active 322 and 324 vehicle detector indicating that the vehicle 104 is absent and the hitch post 110 has not validated the authentication credential (e.g., a random PIN 312, a credit card 314, a synchronization signal 316 from a mobile device 317, etc.), a notification action 330 may be taken. In one embodiment, such notification action may include simply notifying the vehicle user 102 that the authentication credential is not correct such as by an audio or visual communication or by a communication to the vehicle user's mobile device 317.

On the other hand, the notification action 330 may include transmitting a signal to a parking attendant 332, a police authority 334, or a gate 336 of a potential vehicle theft. For example, a parking attendant 332 or a police authority 334 may be notified that the vehicle 104 is potentially being stolen to potentially prevent the stealing of such vehicle. Further, a gate 336 may be closed and locked to ensure that the vehicle 104 is not allowed to leave until a police authority 334 or parking attendant 332 ensures that the vehicle is not being stolen.

Thus, by utilizing the hitch post 110 in conjunction with a vehicle detector 120 in combination with a parking attendant 332, police authority 334, and gate 336, vehicle theft from a parking lot may be significantly prevented and reduced.

It should be appreciated that the hitch post 110 may be implemented as a parking meter or a private vehicle port for one particular parking space 106A or a number of parking spaces 106A-106N dependent upon design considerations. Also, in some embodiments, the hitch post 110 may be implemented as a home vehicle port or as a home computer for a person's home or garage. In this instance, the notification action may be implemented by transmitting a notification action to a police authority that there is a possible home auto theft.

Figure 4:
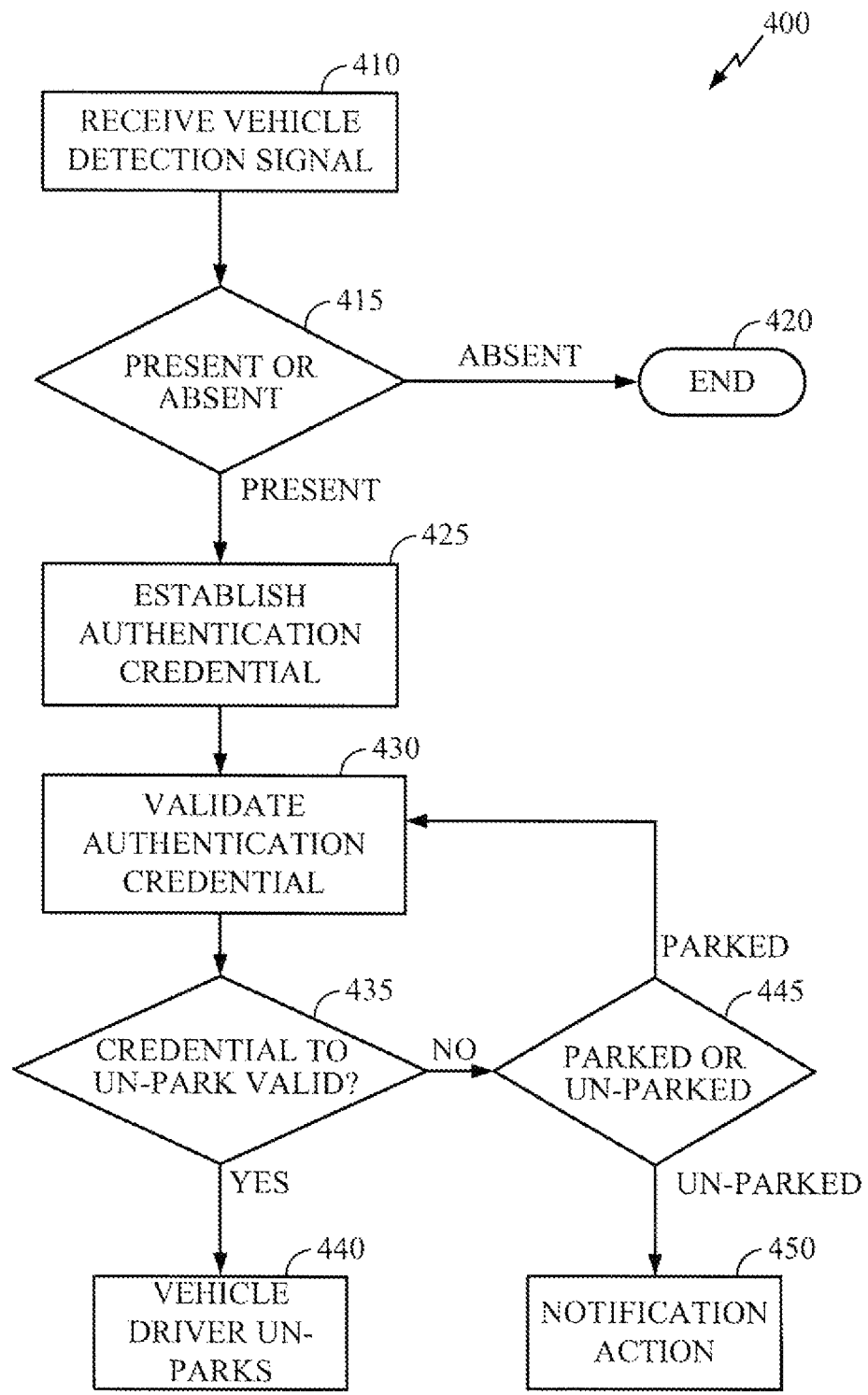
FIG. 4 is a flow diagram illustrating a process to detect vehicle theft.

With reference to FIG. 4, a flow diagram is shown to illustrate a process 400 to detect vehicle theft. At block 410, a vehicle detection signal is received at the hitch post. At decision block 415, it is determined whether a vehicle is present or absent. If absent, a vehicle is not present and process 400 ends (block 420). If a vehicle is present, the hitch post establishes an authentication credential (block 425). Next, the hitch post validates the authentication credential (block 430).

Later, the hitch post determines whether a received authentication credential to un-park the vehicle is valid (decision block 435). If so, the vehicle user may move or un-park the vehicle without a notification action being transmitted (block 440). However, if the authentication credential to un-park is invalid, the process is repeated. If the vehicle remains parked (decision block 445), the vehicle user may attempt to validate the authentication credential again. For example, re-type in the random PIN code.

However, if the vehicle is moved or un-parked (e.g., the vehicle detector determines that the vehicle is now absent) (decision block 445), then at block 450, a notification action is taken (block 450). For example, as previously described, a notification action to a parking attendant, a police authority, or a gate may be sent. It should be appreciated that the method steps of process 400 do not need to be implemented in the order previously-described and may proceed in any suitable order.

A wireless device, such as hitch post 110, computer 200, mobile device 317, or other possible mobile devices or mobile computers previously described may include various components that perform functions based on signals that are transmitted by or received at the wireless device. For example, a wireless headset may include a transducer adapted to provide an audio output based on a signal received via the receiver. A wireless watch may include a user interface adapted to provide an indication based on a signal received via the receiver. A wireless sensing device may include a sensor adapted to provide data to be transmitted to another device.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A hitch post apparatus to detect vehicle theft comprising:
a processor configured to execute instructions to:
receive a vehicle detection signal from a vehicle detector;
determine whether a vehicle is present or absent based upon the vehicle detection signal;
establish an authentication credential at the hitch post apparatus after the vehicle is determined to be present;
validate the authentication credential to indicate validated parking at the hitch post apparatus; and
transmit a notification action from the hitch post apparatus if the authentication credential to un-park the vehicle is not validated and the vehicle is determined to be absent; and
a memory configured to store the instructions,
wherein the authentication credential includes a synchronization signal associated with an ID of a mobile device.

2. The apparatus of claim 1, wherein the vehicle detection signal is received from a passive vehicle detector.

3. The apparatus of claim 2, wherein the passive vehicle detector includes at least one of a weight detector, a metal detector, a video camera, or a radar detector.

4. The apparatus of claim 1, wherein the vehicle detection signal is received from an active detector.

5. The apparatus of claim 4, wherein the active vehicle detector is an RFID token.

6. The apparatus of claim 4, wherein the active vehicle detector is a near field mutual communication system.

7. The apparatus of claim 1, wherein the authentication credential further includes at least one of a credit card or a random PIN generated by the processor.

8. The apparatus of claim 1, wherein transmitting the notification action includes notifying the vehicle user that the authentication credential is not correct.

9. The apparatus of claim 1, wherein transmitting the notification action includes notifying at least one of a parking attendant, a police authority, or a gate.

10. The apparatus of claim 1, wherein the authentication credential is established by at least one of a vehicle user, the processor, or mutually by the processor and the vehicle user.

11. A method to detect vehicle theft comprising:
receiving a vehicle detection signal from a vehicle detector;

determining whether a vehicle is present or absent based upon the vehicle detection signal;

establishing an authentication credential at a hitch post apparatus after the vehicle is determined to be present;

validating the authentication credential to indicate validated parking at the hitch post apparatus; and transmitting a notification action from the hitch post apparatus if the authentication credential to un-park the vehicle is not validated and the vehicle is determined to be absent, wherein the authentication credential includes a synchronization signal associated with an ID of a mobile device.

12. The method of claim 11, wherein the vehicle detection signal is received from a passive vehicle detector.

13. The method of claim 12, wherein the passive vehicle detector includes at least one of a weight detector, a metal detector, a video camera, or a radar detector.

14. The method of claim 11, wherein the vehicle detection signal is received from an active detector.

15. The method of claim 14, wherein the active vehicle detector is an RFID token.

16. The method of claim 14, wherein the active vehicle detector is a near field mutual communication system.

17. The method of claim 11, wherein the authentication credential further includes at least one of a credit card or a random PIN.

18. The method of claim 11, wherein transmitting the notification action includes notifying the vehicle user that the authentication credential is not correct.

19. The method of claim 11, wherein transmitting the notification action includes notifying at least one of a parking attendant, a police authority, or a gate.

20. A hitch post apparatus to detect vehicle theft comprising:

means for receiving a vehicle detection signal from a vehicle detector;

means for determining whether a vehicle is present or absent based upon the vehicle detection signal;

means for establishing an authentication credential at the hitch post apparatus after the vehicle is determined to be present;

means for validating the authentication credential to indicate validated parking at the hitch post apparatus; and means for transmitting a notification action from the hitch post apparatus if the authentication credential to un-park the vehicle is not validated and the vehicle is determined to be absent, wherein the authentication credential includes a synchronization signal associated with an ID of a mobile device.

21. The apparatus of claim 20, wherein the vehicle detection signal is received from a passive vehicle detector.

22. The apparatus of claim 21, wherein the passive vehicle detector includes at least one of a weight detector, a metal detector, a video camera, or a radar detector.

23. The apparatus of claim 20, wherein the vehicle detection signal is received from an active detector.

24. The apparatus of claim 23, wherein the active vehicle detector is an RFID token.

25. The apparatus of claim 23, wherein the active vehicle detector is a near field mutual communication system.

26. The apparatus of claim 20, wherein the authentication credential further includes at least one of a credit card or a random PIN.

27. The apparatus of claim 20, wherein transmitting the notification action further comprises means for notifying the vehicle user that the authentication credential is not correct.

28. The apparatus of claim 20, wherein transmitting the notification action further comprises means for notifying at least one of a parking attendant, a police authority, or a gate.

29. The apparatus of claim 20, wherein the authentication credential is established by at least one of a vehicle user, the means for establishing the authentication credential, or mutually by the means for establishing the authentication credential and the vehicle user.

30. A computer program product comprising:

a computer-readable medium comprising code for:

receiving a vehicle detection signal from a vehicle detector;

determining whether a vehicle is present or absent based upon the vehicle detection signal;

establishing an authentication credential at a hitch post apparatus after the vehicle is determined to be present;

validating the authentication credential to indicate validated parking at the hitch post apparatus; and transmitting a notification action from the hitch post apparatus if the authentication credential to un-park the vehicle is not validated and the vehicle is determined to be absent, wherein the authentication credential includes a synchronization signal associated with an ID of a mobile device.

31. The computer program product of claim 30, wherein the vehicle detection signal is received from a passive vehicle detector.

32. The computer program product of claim 31, wherein the passive vehicle detector includes at least one of a weight detector, a metal detector, a video camera, or a radar detector.

33. The computer program product of claim 30, wherein the vehicle detection signal is received from an active detector.

34. The computer program product of claim 33, wherein the active vehicle detector is an RFID token.

35. The computer program product of claim 33, wherein the active vehicle detector is a near field mutual communication system.

36. The computer program product of claim 30, wherein the authentication credential further includes at least one of a credit card or a random PIN.

37. The computer program product of claim 30, wherein transmitting the notification action further comprises code for notifying the vehicle user that the authentication credential is not correct.

38. The computer program product of claim 30, wherein transmitting the notification action further comprises code for notifying at least one of a parking attendant, a police authority, or a gate.

* * * * *